(12) United States Patent
Whyte

(10) Patent No.: US 8,194,532 B1
(45) Date of Patent: Jun. 5, 2012

(54) MIXED RADIX DISCRETE FOURIER TRANSFORM

(75) Inventor: Andrew Whyte, Edinburgh (GB)

(73) Assignee: Xilinx, Inc., San Jose, CA (US)

(*) Notice: Subject to any disclaimer, the term of this patent is extended or adjusted under 35 U.S.C. 154(b) by 290 days.

(21) Appl. No.: 12/692,813

(22) Filed: Jan. 25, 2010

(51) Int. Cl.
*H04J 11/00* (2006.01)
(52) U.S. Cl. .......... 370/210; 708/408; 708/409
(58) Field of Classification Search .......... 370/210, 370/211; 708/403–410
See application file for complete search history.

(56) References Cited

U.S. PATENT DOCUMENTS 7,792,892 B2 * 9/2010 Uehara .......... 708/404

OTHER PUBLICATIONS

U.S. Appl. No. 11/445,066, filed May 31, 2006, Simkins et al.
U.S. Appl. No. 12/391,231, filed Feb. 23, 2009, Szedo et al.
Altera Corp., *1536-Point FFT for 3GPP Long Term Evolution*, App. Note 480, Oct. 2007, pp. 1-10, Ver. 1.0., Altera Corp., San Jose, California, USA.
Engineering Productivty Tools Ltd., *Mixed Radix Algorithms*, copyright 1999, downloaded Oct. 7, 2009, pp. 1-6, <www.engineeringproductivitytools.com/stuff/T0001/PT07.HTM>, Engineering Productivity Tools Ltd., Watford, Hertfordshire, U.K.

* cited by examiner

*Primary Examiner* — Gary Mui
(74) *Attorney, Agent, or Firm* — LeRoy D. Maunu

(57) ABSTRACT

An efficient circuit and method for performing radix-3 Discrete Fourier transform (DFT) of a $3*2^M$ size data frame are provided. The data frame is split and fast Fourier transform (FFT) processed as three sub-frames. Radix-3 operations are performed on the FFT processed sub-frames over a number of stages with time shared hardware to compute the DFT of the data-frame. FFT operations are performed on the second and third sub-frames to produce respective sub-transforms. Concurrently with FFT processing of the first sub-frame, butterfly operations are performed on the sub-transforms of the second and third sub-frames. Through the use of time-shared hardware and arranging FFT operations to correspond with radix-3 operations at various stages of processing, the DFT is performed with existing FFT processors while reducing resource requirements and/or reducing DFT transform time over the full-parallel radix-3 implementation.

20 Claims, 9 Drawing Sheets

MIXED RADIX DISCRETE FOURIER TRANSFORM

FIELD OF THE INVENTION

The present invention generally relates to the field of digital signal processing (DSP) of discrete Fourier transforms.

BACKGROUND

The discrete Fourier transform (DFT) is a well known algorithm used in digital signal processing for transforming data-sets between time and frequency domains. This transform is frequently used in several fields of digital signal processing such as signal and image processing, digital filtering, frequency analysis, speech recognition, etc. The fast Fourier transform (FFT) is an efficient algorithm for computing the Discrete Fourier Transform. The FFT takes advantage of the divide and conquer approach, in which an N-point DFT is broken down into N number of X point DFTs, where X is the radix number. This results in considerable savings of computation time. If the sample size is a power of two, the transform can be recursively sub-divided into equal sized sub-transforms, processed, and reconstructed with a series of butterfly circuits. A radix-2 butterfly circuit computes two outputs that are a weighted sum of two sub-transform inputs to the circuit. Sub-transforms are combined in a reverse recursive fashion to compute the FFT of the entire sample size.

If the time series contains $N=2^M$ samples, then for the N frequency domain samples the FFT entails $N\log_2 N$ multiply operations (assuming a radix-2 butterfly). In contrast, the DFT algorithm requires $N^2$ multiply operations. The FFT advantage grows as N increases. Thus, an 8 point DFT and FFT require 64 and 24 multiply operations, respectively, while an 8192 point DFT and FFT require $67.1 \times 10^6$ and 106,496 multiply operations, respectively.

A number of wireless standards utilize inverse FFT and FFT operations for respective modulation and demodulation of signals. In the 3GPP LTE wireless standard, the majority of supported bandwidths can be represented with datasets having a sample size that is a power-of-two (e.g. 2048-points for the 20 MHz bandwidth). Datasets of these bandwidths can be modulated and demodulated using the fast Fourier transform.

However, in many applications a sample size that is not a power of two is required. For example, the 3GPP LTE wireless standard requires support for several bandwidths that are not a power of two. In particular, in order to modulate and demodulate the 15 MHz bandwidth defined in the standard's specification, an FFT over 1536 points is required. For support of the Multi-Media Broadcast over a Single Frequency Network (MBSFN) option in the standard, a 3072-point FFT is required. These sample sizes can each be sub-divided and processed as three sub-transforms that are a power of two using FFT processing. However, in order to combine the three processed sub-transforms, a radix-3 processing stage is needed to compute a weighted sum of three sub-transforms to produce the DFT of the entire sample size.

In prior art implementations, the radix-3 combinational stage has been implemented as a full-parallel circuit requiring at least three complex multipliers and six complex add/subtracts. This is in addition to a FFT module for processing the sub-transforms that are a power-of-two sample size. The radix-3 stage is expensive in resource terms, but permits a streaming throughput, allowing processing of a complex data sample per clock cycle. However, in general, wireless communication systems do not require the very high throughput of a streaming FFT, and are resource sensitive. For this reason, a full-parallel implementation of the radix-3 stage is undesirable. The radix-3 processing may also be implemented within the FFT module itself. However, this has the disadvantage of requiring modifications to the FFT circuitry, adding significant complexity to the control logic and datapath.

The present invention may address one or more of the above issues.

SUMMARY

In one embodiment of the present invention, a circuit is provided for performing mixed-radix discrete Fourier transform on a frame of size N. The circuit includes a fast Fourier transform processor block and a memory block. The memory block includes an input coupled to an output of the fast Fourier transform processor block by means of a first circuit path and an output coupled to an input of the fast Fourier transform processor block. The circuit also includes a radix-2 butterfly circuit having first and second inputs coupled to the memory block by means of respective second and third circuit paths. The radix-2 butterfly circuit also includes first and second outputs coupled to the memory block. The memory block and fast Fourier transform processor block are configured to sub-divide the frame into first, second, and third sub-frames of size N/3. The Fourier transform processor block performs fast Fourier transformation on each of the sub-frames to produce a sub-transform. The radix-2 butterfly circuit is configured to perform radix-2 summation of two of the sub-transforms concurrently with fast Fourier transform of one of the sub-frames.

In another embodiment of the present invention, a method for performing discrete Fourier transforms is provided. A data frame of size N is received and subdivided into three sub-frames of size N/3, including a first sub-frame, a second sub-frame, and a third sub-frame beginning at respective indexes 0, 1 and 2 of the data frame. The second sub-transform is input to a fast Fourier transform block to produce a second sub-transform. A first twiddle factor is applied to the second sub-transform to produce a rotated second sub-transform. The third sub-transform is input to the fast Fourier transform block to produce a third sub-transform. A second twiddle factor is applied to the third sub-transform to produce a rotated third sub-transform. The rotated second and third sub-transforms are input to a butterfly block to produce a first upper output and a first lower output. The first lower output is complex multiplied by a twiddle factor to produce a rotated first lower output. The first sub-frame is input to the fast Fourier transform block to produce a first sub-transform. The first upper output and first sub-transform are input to the butterfly block to produce a second upper output and a second lower output. The second lower output and the rotated first lower output are input to the butterfly block to produce a third upper output and a third lower output. The second upper output, the third upper output, and the third lower output are stored in a computer readable storage medium.

In yet another embodiment of the present invention, an Orthogonal Frequency Division Multiplex (OFDM) communication device is provided. The communication device includes an input block and a fast Fourier transform block that is coupled to the input block. A complex multiplication block is coupled to an output of the fast Fourier transform block. The complex multiplication block is configured to apply twiddle factors to the output of the fast Fourier transform block. A storage unit having is included, the storage unit includes an input coupled to the input section and an input coupled to an output of the complex multiplication block. The communication device also includes a radix-2 butterfly block having a first input and second input coupled to the storage unit. An output block is coupled to the fast Fourier transform block. The fast Fourier transform block performs transformations on sub-frames of size N/3 of a data frame of size N. The radix-2 butterfly block is configured to perform radix-3 summations in three iterative stages of radix-2 summations.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIG. 6-1 shows a block diagram of a circuit for performing mixed radix Fourier transforms;

FIG. 6-2 shows a block diagram of a circuit for performing mixed radix Fourier transforms;

FIGS. 7-1 and 7-2 illustrate a block diagram of an orthogonal frequency-division multiplexing (OFDM) based wireless communication system with radix-3 modulation and demodulation circuits, in accordance with various embodiments of the present invention.

DETAILED DESCRIPTION

Figure 1:
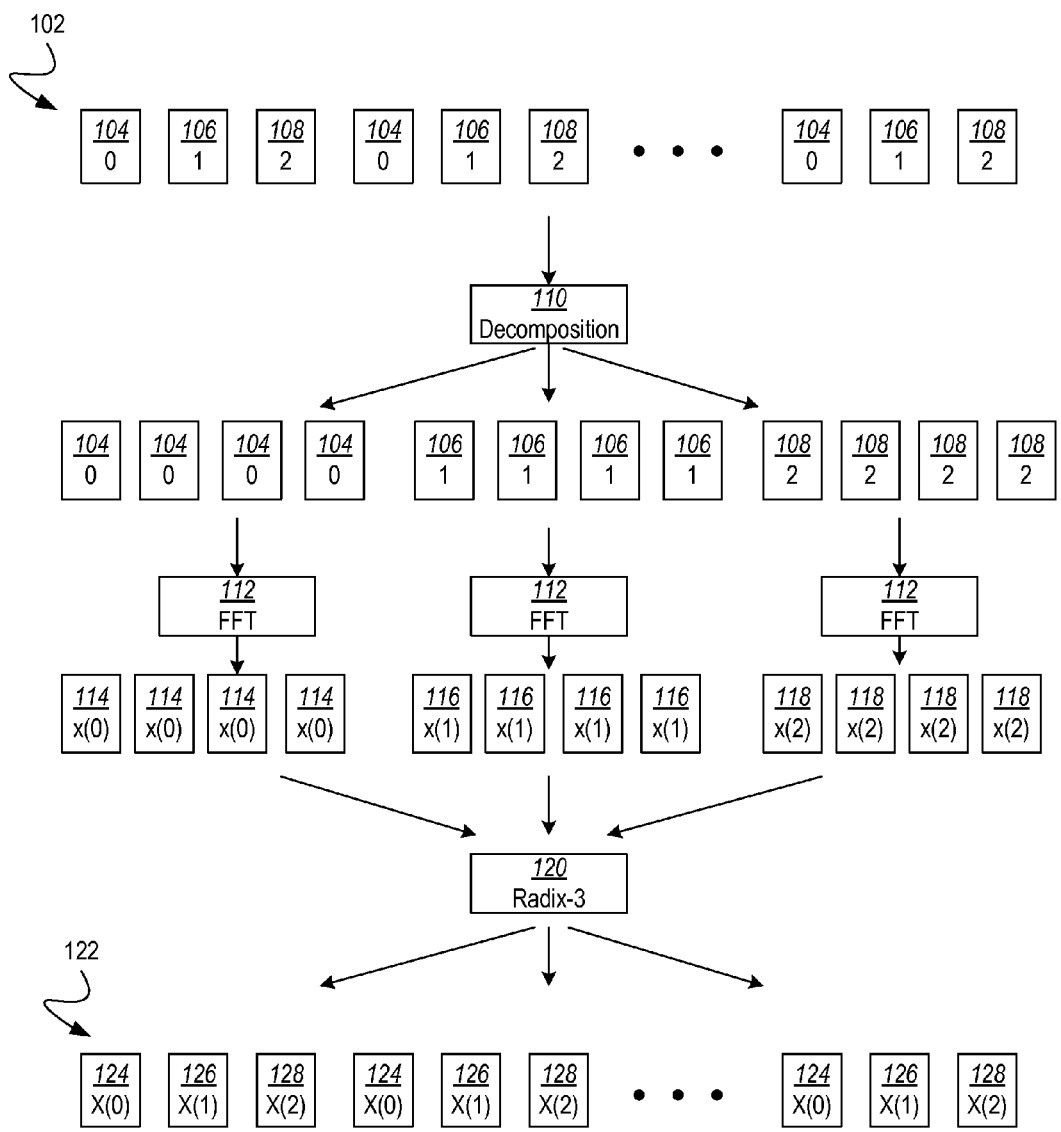
FIG. 1 illustrates the process of decomposition and processing of a transform in a fully parellel radix-3 implementation.

Discrete Fourier transforms (DFTs) are used in digital signal processing for transforming data-sets between time and frequency domains. The fast Fourier transform (FFT) is an efficient algorithm for computing the DFT of data frames of sample size that are a power of two. However, in many applications transformations of data frames that are not a power of two are required. For example, in order to support the 15 MHz bandwidth required by the 3GPP LTE wireless standard, a Fourier transform must be performed with a data frame size that is not a power of two. Specifically, frame sizes of 1536 and 3072 must be supported. To perform these non-power-of-two transforms, a radix-3 processing stage is required in the FFT processing.

The present invention provides a hardware efficient circuit and method for performing radix-3 DFT of $3*2^M$ size data frames. Each data frame is split and FFT processed as three sub-transforms. Radix-3 operations are performed on the sub-transforms over a number of stages to compute the DFT of the entire data-frame from the sub-transforms. Through the use of time-shared hardware and arranging FFT operations to correspond with radix-3 operations at various stages of processing, various embodiments of the present invention allow for radix-3 DFT to be implemented with existing FFT processors while reducing resource requirements and/or reducing DFT transform time over the full-parallel radix-3 implementation.

For ease and clarity of explanation, the following embodiments of the present invention are primarily described in terms of performing forward DFT. However, the invention is not limited as such and is understood to be applicable to applications implementing inverse DFT operations as well.

The discrete Fourier transform (DFT) equation for a forward transform is given by equations:

$$\text{For } k = 0, 1, 2, \ldots N - 1: X(k) = \sum_{n=0}^{N-1} x(n) * W\frac{ik}{N}$$

and $$W_N^{ik} = e^{-j2\pi kn/N}$$

where N=the point size, x(n) is the input sequence in the time domain, and X(k) is the transformed sequence in the frequency domain. The complex exponential $W_N^{ik}$ represents the root of unity complex multiplicative constants of the butterfly operations used to combine smaller sub-transforms. The root of unity complex multiplicative constants are otherwise known as phase factors or twiddle factors, and such terms are used interchangeably herein.

In mixed-radix transforms, the data frame is split into a non-power of two number of sub-frames, processed, and recombined. Mixed-radix decomposition is expressed by:

$$X(k_x, k_y) = \sum_{n_x=0}^{N_x-1}\left[e^{-\frac{j2\pi k_y n_x}{N_x N_y}}\sum_{n_y=0}^{N_y-1} x(n_x, n_y) * e^{-\frac{j2\pi k_y n_y}{N_y}}\right] * e^{-\frac{j2\pi k_x n_x}{N_x}}$$

Each inner summation is an $N_y$-point DFT. The $N_y$-point DFTs may be performed by an FFT module if $N_y$ is a power of two. The $N_y$-point sub-transforms must be rotated by twiddle factors based on $N=N_xN_y$, which is the complex exponential outside the square-bracketed sum. The outermost sum is an $N_x$-point DFT, using the right-most complex exponential phase factors.

In radix-3 decomposition, the data frame is split into three N/3-point sub-frames. A Fourier sub-transform is computed for each sub-frame and recombined with some additional rotation factors. For example, a 1536-point transform can be performed by decomposing the data frame into three, $N_y$=512-point, FFT sub-transforms. To compute the entire transform from the three FFT sub-transforms, the second and third sub-transforms are rotated by performing complex multiplication with respective twiddle factors. The twiddle factor of the first sub-transform is constant value of 1. An $N_x$=3-point DFT is then performed on the result.

FIG. 1 illustrates the process of decomposition and processing of a transform in a fully parallel radix-3 implementation. Data frame 102 includes a number of N samples which are split into three sub-frame groups of samples 104, 106, and 108 by decomposition step 110. Samples are modularly placed into sub-frames based on alternating indexes. For example, the first sub-frame 104 corresponds to samples at indexes 0+3d, the second sub-frame 106 corresponds to samples at indexes 1+3d, and the third sub-frame 108 corresponds to samples at indexes 2+3d, where $0 \leq d \leq ((N/3)-1)$. An FFT is performed on each sub-frame group to produce sub-transforms 114, 116, and 118. The transform of the entire sample size 122 is computed by combining sub-transforms 114, 116, and 118 with radix-3 processing stage 120.

Figure 2:
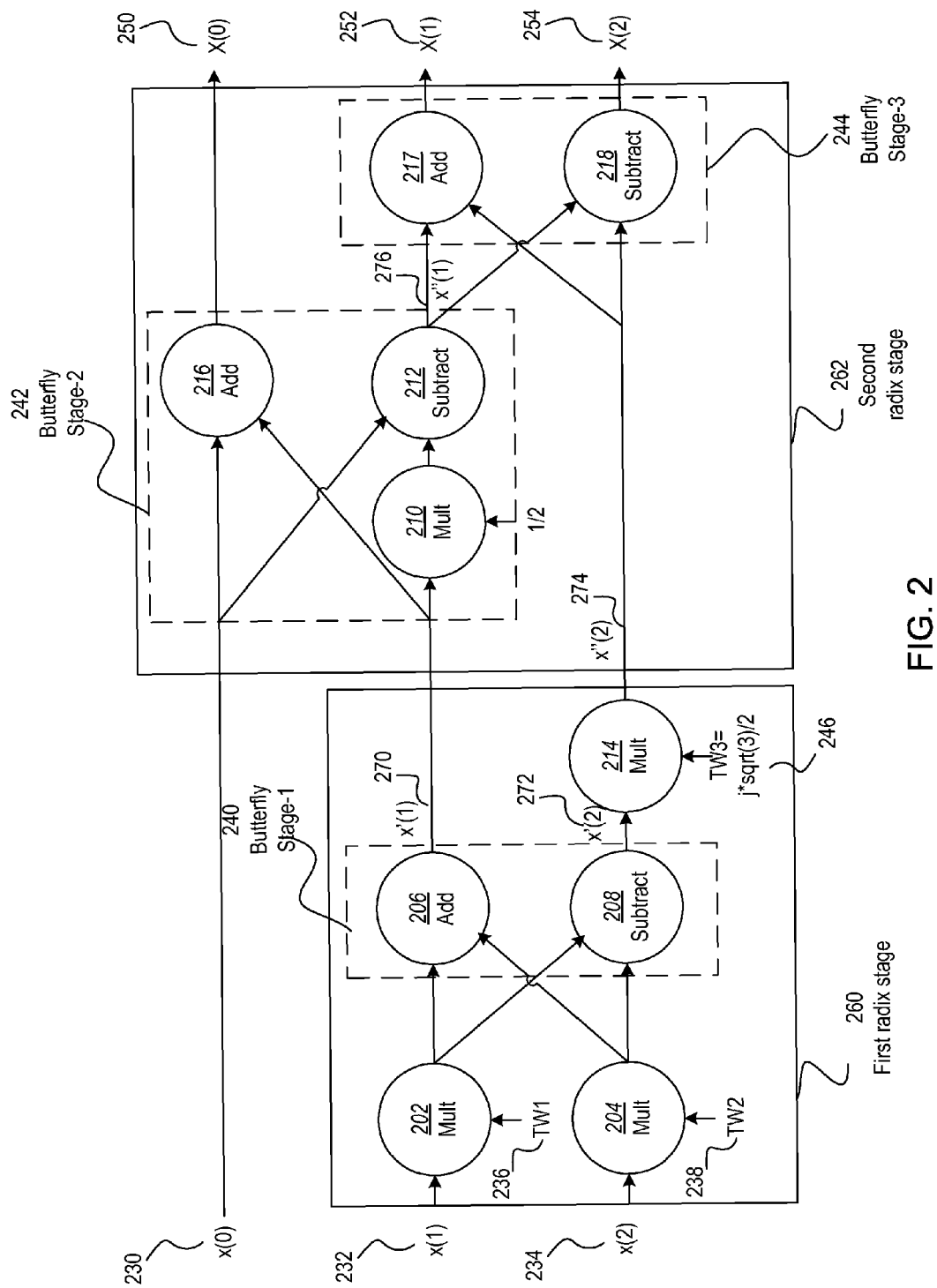
FIG. 2 shows a fully parallel radix-3 circuit segmented into multiple operations that can be iteratively performed by a circuit containing a radix-2 butterfly circuit.

FIG. 2 shows a block diagram of a fully parallel radix-3 processing engine. The radix-3 engine receives first, second, and third sub-transforms 230, 232, and 234 as input. The second and third sub-transforms 232 and 234 are respectively multiplied by twiddle factors TW1 (236) and TW2 (238) by complex multiplication blocks 202 and 204 to produce rotated second and third sub-transforms. The rotated sub-transforms output from complex multiplication blocks 202 and 204 are input to first butterfly stage 240. Butterfly stage 240 performs complex addition and subtraction of the output of complex multiplication blocks 202 and 204 with addition and subtraction blocks 206 and 208 to produce a first upper output 270, corresponding to the second sub-transform, and a first lower output 272, corresponding to the third sub-transform. The first lower output is multiplied with a twiddle factor TW3 (246) by complex multiplier block 214 to produce a rotated first lower output 274.

The first sub-transform 230 and the first upper output 270 are input to butterfly stage 242. Butterfly stage 242 performs complex addition and subtraction of the first sub-transform and first upper output 270 with addition and subtraction blocks 216 and 212 to produce a second upper output 250 and a second lower output 276. In this stage, first upper output 270 is right-shifted by multiplier 210 prior to input to subtraction block 212.

The second lower output 276 and the rotated first lower output 274 are input to butterfly stage 244. Butterfly stage 244 performs complex addition and subtraction with addition and subtraction blocks 217 and 218 to produce third upper and third lower outputs 252 and 254. The resulting second upper 250, third upper 252, and third lower 254 outputs correspond to respective first 230, second 232, and third 234 sub-transforms and are a weighted sum of the input sub-transforms. The second upper 250, third upper 252, and third lower 254 outputs are merged to form the transform of the entire data-frame.

The various embodiments of the present invention implement the three butterfly stages 240, 242, and 244 of the radix-3 processing shown in FIG. 2, with multiple processing iterations of a single radix-2 butterfly circuit. Through time-sharing reuse of a single radix-2 butterfly circuit, radix-3 processing can efficiently be performed with less hardware, reducing the cost of the overall circuit.

In some embodiments of present invention, an FFT processing block can be used to sequentially process two or more sub-transforms. The second and third FFT sub-transforms are processed before the first FFT sub-transform in order to take advantage of independent data-paths of the radix-3 circuit. In these embodiments, the radix-3 processing is performed in two stages 260 and 262 as shown in FIG. 2. Because the processes performed in the first radix stage 260 are independent of the first sub-transform, they can be performed concurrently with FFT processing of the first sub-transform, to reduce output latency.

Figure 3:
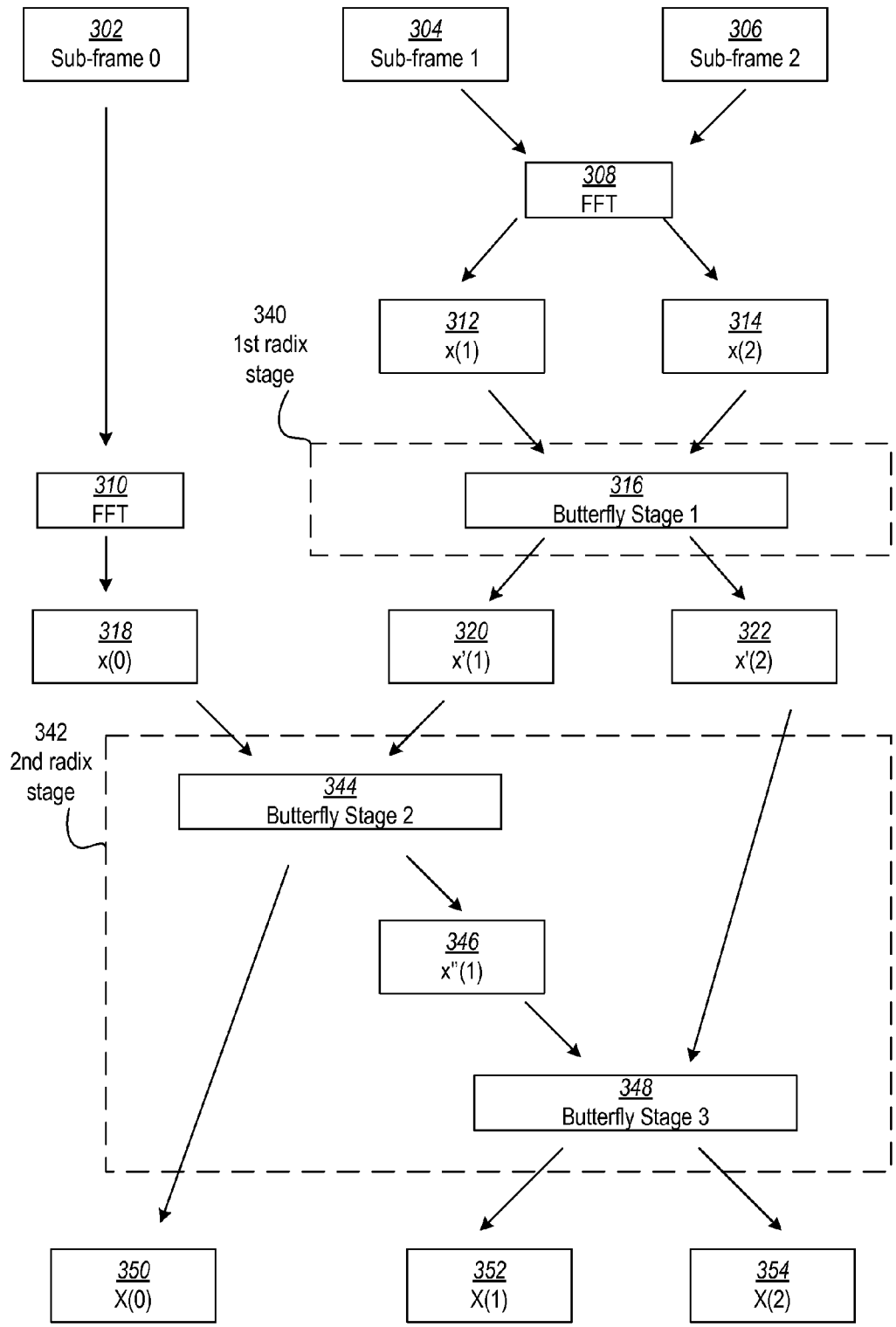
FIG. 3 illustrates the process flow of a radix-3 Fourier transform in accordance with various embodiments of the present invention.

FIG. 3 illustrates the process flow of a radix-3 Fourier transform in accordance with various embodiments of the present invention. A data-frame of N samples is divided into first, second, and third sub-frames 302, 304, and 306. An FFT is performed on the second and third sub-frames 304 and 306 at FFT stage 308, to produce second and third sub-transforms 312 and 314.

In a first radix-stage 340, second and third sub-transforms 312 and 314 are processed by a first butterfly stage 316 to produce resulting first and second sub-transforms 320 and 322. Rotation factors (not shown) are also applied during the first radix-stage 340. An FFT is performed, concurrently with the first radix-stage 340, on the first sub-frame 302 at step 310 to produce a first sub-transform 318.

The first sub-transform 318 and the second and third sub-transforms 320 and 322 are processed by a second radix-stage 342 to produce sub-frames 350, 352, and 354 corresponding to the Fourier transformation for the entire data frame. In the second radix-stage 342, the first and second sub-transforms 318 and 320 are processed by a second butterfly stage 344 to produce first sub-frame output 350 of the complete transform and produce sub-transform 346. Sub-transforms 322 and 346 are processed by a third butterfly stage 348 to produce second and third sub-frame outputs 352 and 354 of the complete transform.

Figure 4:
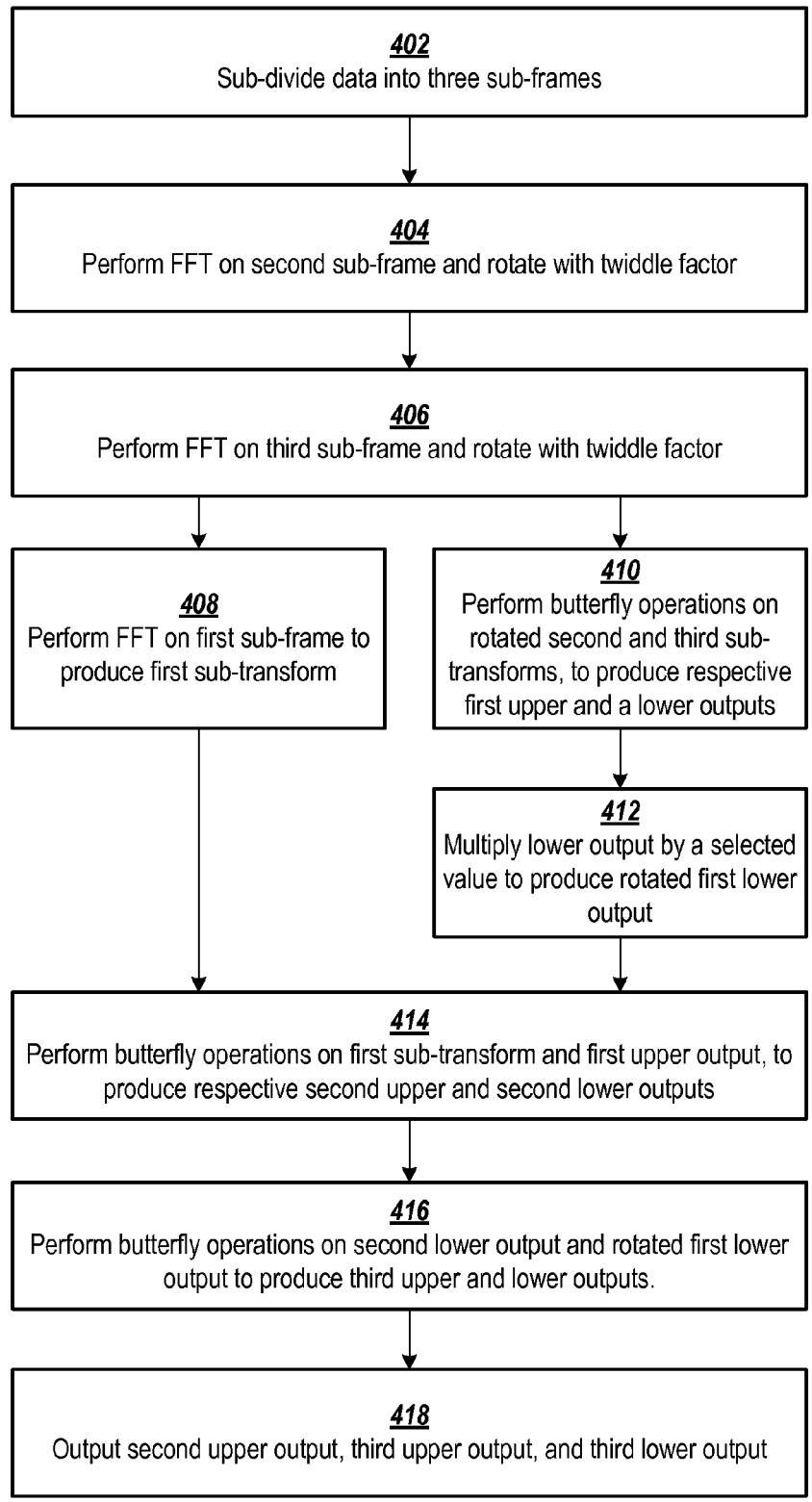
FIG. 4 shows a flowchart of a method for performing Fourier transform of a data frame of sample size $3*2^M$, in accordance with several embodiments of the invention.

FIG. 4 shows a flowchart of an example process to perform discrete Fourier transformation on a data frame of $3*2^M$ samples in accordance with one embodiment of the invention. A data-frame is sub-divided into first, second, and third sub-frames at step 402. An FFT is performed on the second and third sub-frames at steps 404 and 406 to produce respective second and third sub-transforms. Twiddle factors are also applied to rotate the second and third sub-transforms at steps 404 and 406, respectively. In this example, an FFT is performed on the second and third sub-frames sequentially. In some embodiments, the FFT sub-transforms are performed concurrently to improve throughput of data-frames.

The FFT is performed on the first sub-frame at step 408 to produce a first sub-transform. While the first sub-frame is being processed at step 408, butterfly operations are performed on the second and third sub-transforms to produce first upper and lower outputs at step 410. The first lower output is multiplied with a twiddle value to produce a rotated first lower output at step 412. The multiplication of step 412 is performed concurrently with the FFT processing of step 408. In some embodiments, the application of twiddle factors, performed in step(s) 404 and/or 406, is also performed concurrently with the FFT processing of the first sub-frame in step 408.

Butterfly operations are performed on the first sub-transform and the first upper output, to produce respective second upper and lower outputs at step 414. Butterfly operations are performed on the second lower output and the rotated first lower output, to produce respective third upper and lower outputs at step 416. Second upper output, third upper output, and third lower output are output at step 418.

Figure 5:
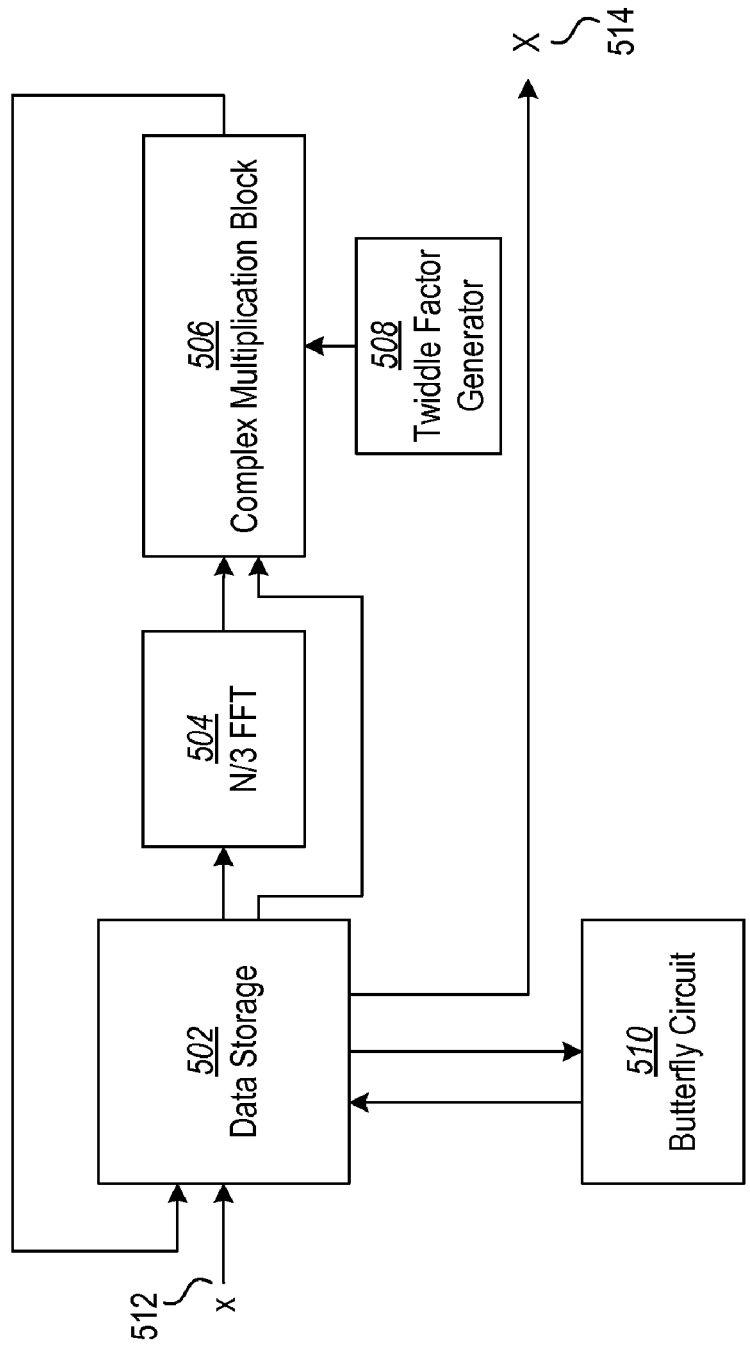
FIG. 5 shows a block diagram of a circuit for performing mixed radix Fourier transforms.

FIG. 5 shows a block diagrams of an example circuit for performing discrete Fourier transforms of data frames containing $N=3*2^M$ samples in accordance with one embodiment of the invention. In this example, a data frame, x (512), is received by data storage unit 502. Sub-frames of size N/3 of the data-frame are output from data storage unit 502 to N/3 FFT processor 504 to compute sub-transforms of the sub-frames.

Complex multiplication block 506 is coupled to an output of N/3 FFT processor 504 and an output of data storage unit 502 to apply twiddle factors generated by twiddle factor generator 508. In some implementations, twiddle factors may be pre-computed and stored in data storage unit 502 or another memory. In such implementations, twiddle factor generator 508 may be omitted. An output of complex multiplication block 506 is coupled to an input of data storage unit 502 for storage of sub-transforms during various stages of processing.

Butterfly circuit 510 is coupled to an output and an input of data storage unit 502 and is configured to receive sub-transforms and perform butterfly operations on the sub-transforms during various stages of processing. A DFT X (514) of the input data frame is output from data-storage unit 502.

The example circuit is configured to operate in at least three modes. While in the first mode, the circuit outputs second and third sub-frames of the input data- frame 512 from the data storage unit 502 to the N/3 FFT processor 504 to produce respective second and third sub-transforms of the second and third sub-frames. Depending on the implementation of the N/3 FFT processor 504, FFT processing of second and third sub-frames may be performed sequentially or concurrently. For example, the processor may have a maximum block size of 2*(N/3) and be configurable to process two N/3-sized blocks separately.

While operating in the second mode, the circuit outputs the first sub-frames of the input data-frame 512 from the data storage unit 502 to the N/3 FFT processor 504 to produce a first sub-transform. Concurrent with the processing of the first sub-frame by N/3 FFT processor 504, the circuit outputs the first and second sub-transforms from the data storage unit 502 to the butterfly circuit 510 and complex multiplication circuit 506 to perform the first radix-stage processes indicated by 260 in FIG. 2. In some implementations, the circuit may perform one or more of the first radix-stage processes indicated by 260 in FIG. 2, such as the application of the twiddle factors 202 and/or 204, while operating in the first mode.

While operating in the third mode, the circuit outputs the first, second, third sub-transforms from the data storage unit 502 to the butterfly circuit 510 to sequentially perform the second butterfly stage 242 and third butterfly stage 244 operations indicated in the second radix stage 262 of FIG. 2.

Figures 1, 6:
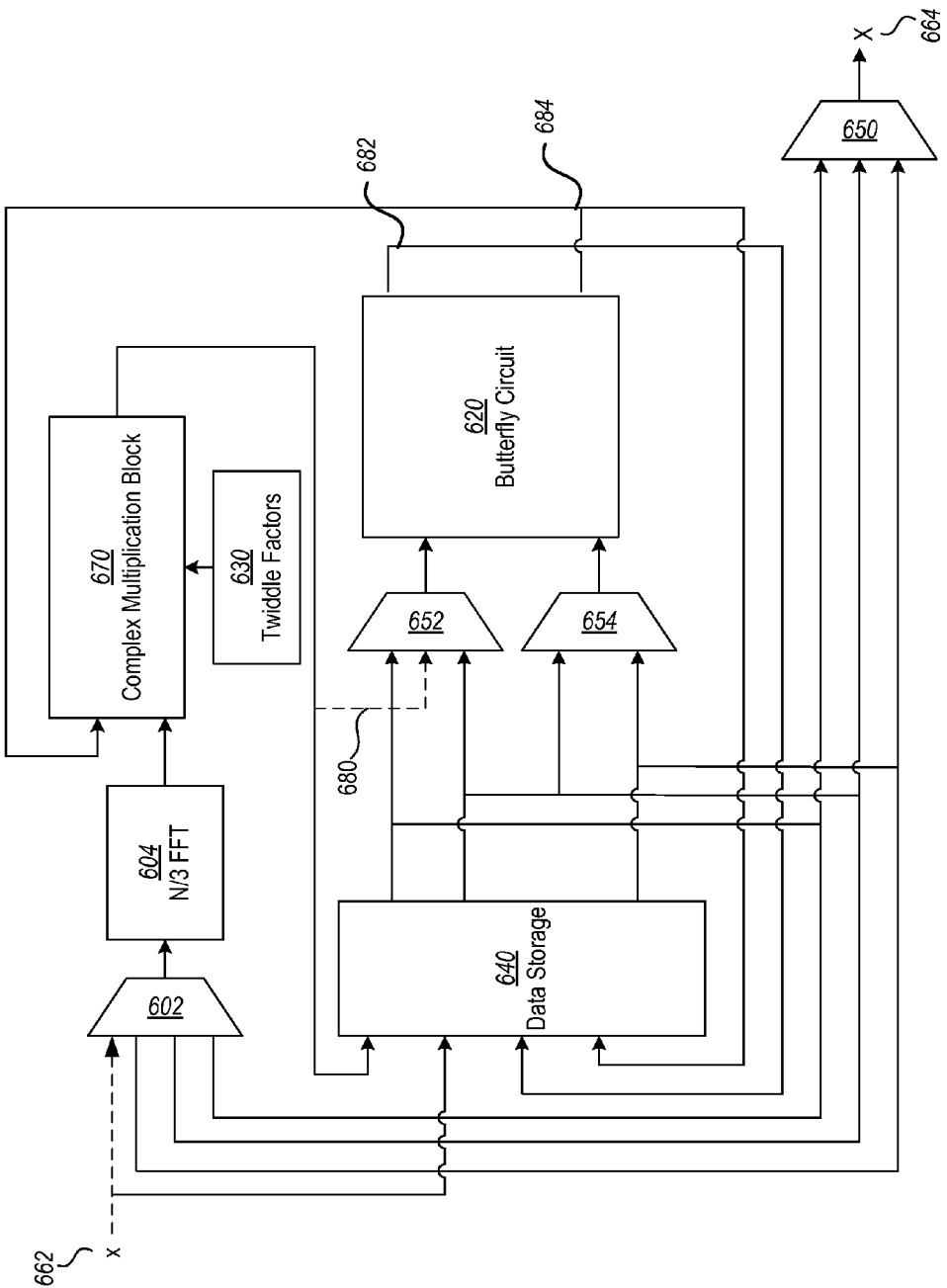
Figures 2, 6:
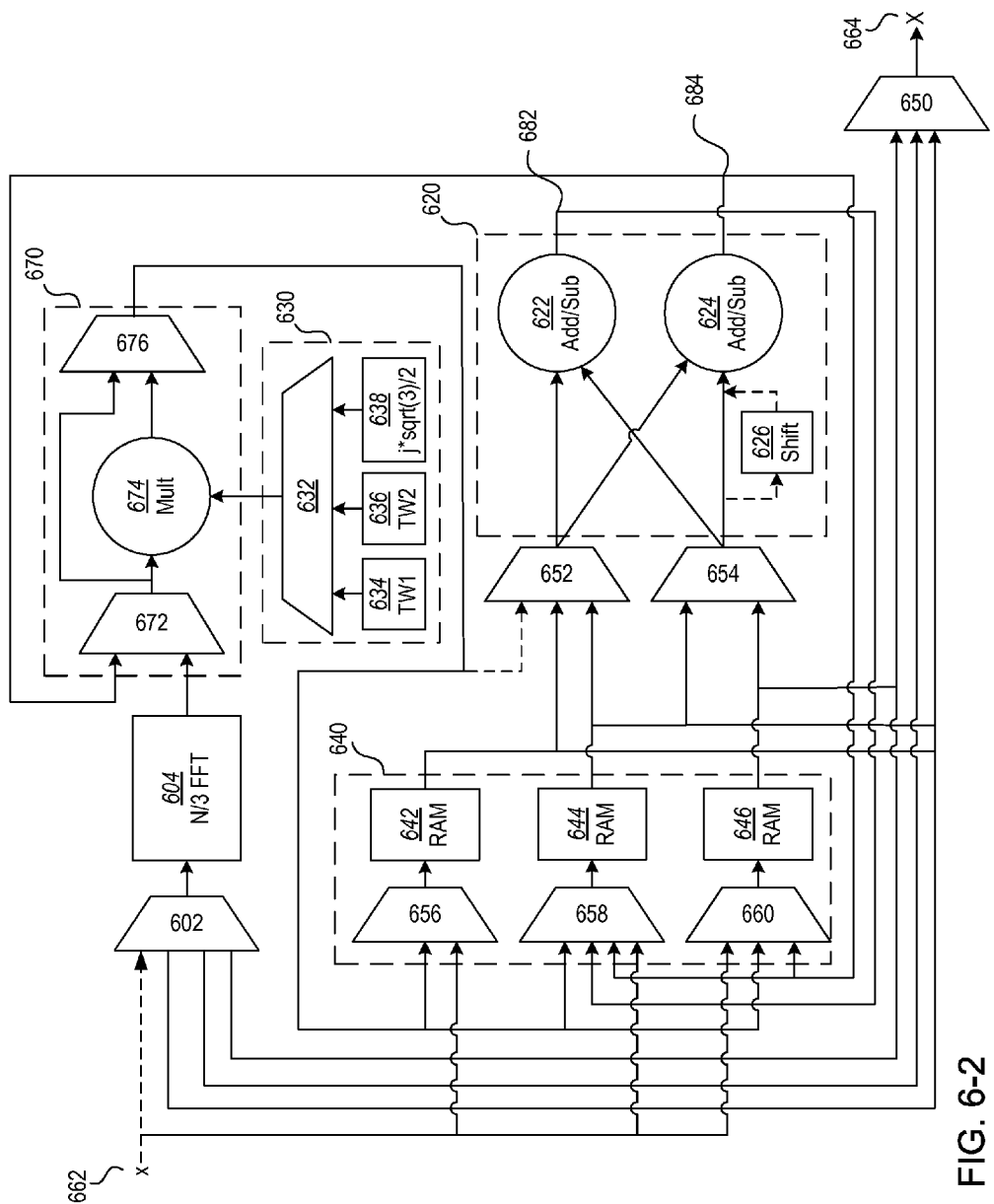

FIG. 6-1 shows a block diagram of an example circuit for performing discrete Fourier transforms of a data frame containing $N=3*2^M$ samples in accordance with another embodiment of the invention. In this example, a data frame 662 is received by data storage unit 640. Sub-frames of the data-frames of size N/3 are output from data storage unit 640 to N/3 FFT processor 604 to compute sub-transforms of the sub-frames. The data frame 662 is input to data storage unit 640 and sub-divided by selectively outputting samples of data frame to N/3 FFT processor 604. In some embodiments, the data frame 662 may be subdivided prior to being input to the circuit. In such embodiments, an initial sub-frame of the data frame may be input to N/3 FFT processor and data storage unit 640 concurrently. Multiplexer 602 is coupled to the data storage unit 640 and optional input 662 to select sub-frames to be input to N/3 FFT processor 604.

Complex multiplication block 670 is coupled to an output of N/3 FFT processor 604 to rotate sub-transforms output from N/3 FFT processor 604 with applicable twiddle factors generated by twiddle factor circuit 630. Resulting sub-transforms are output from complex multiplication block 670 to data storage unit 640. In some implementations, twiddle factors may be pre-computed and stored in data storage unit 640 or another memory. In such implementations, twiddle factor circuit 630 may be omitted. An output of complex multiplication block 670 is coupled to an input of data storage unit 302 for storage of sub-transforms during various stages of processing.

Butterfly circuit 620 is coupled to output of data storage unit 640 via multiplexers 652 and 654. Multiplexers 652 and 654 select sub-transforms that are to be input to butterfly circuit 620 during various stages of processing. The butterfly circuit 620 performs radix-2 butterfly operations on the sub-transforms received and outputs the processed sub-transforms to data storage unit 640.

The example circuit is configured to operate in three modes. While in the first mode, second and third sub-frames of the input data-frame 662 are input from the data storage unit 640 to the N/3 FFT processor 604 via multiplexer 602 to produce respective second and third FFT sub-transforms of the second and third sub-frames. The second and third sub-transforms are rotated with twiddle factors applied by complex multiplication block 670 and the rotated second and third sub-transforms are stored in data storage unit 640. Depending on the implementation of the N/3 FFT processor 304, FFT processing second and third sub-frames may be performed sequentially or concurrently.

While in the second mode, the first sub-frame of the input data-frame 662 is input from the data storage unit 640 to the N/3 FFT processor 604 via multiplexer 602 to produce a first sub-transform. The first sub-transform is output to data storage unit 640 via complex multiplication block 670. Concurrent with the processing of the first sub-frame by N/3 FFT processor 604, the second and third sub-transforms are input from the data storage unit 640 to the butterfly circuit 620 via multiplexers 652 and 654 to perform the remaining first radix-stage processes indicated by 260 in FIG. 2. A first upper output, corresponding to the second sub-transform, is output from an upper output 682 of the butterfly circuit 620 to data storage unit 640. A first lower output, corresponding to the third sub-transform, is output from a lower output 684 of the butterfly circuit to an input of complex multiplication block 670. Complex multiplication block applies a twiddle factor of $$j*\frac{\sqrt{(3)}}{2}$$

to the first lower output and outputs the rotated first lower output to data storage unit 640. In some implementations, the circuit may be configured to perform the application of the twiddle factors to the first and second sub-transforms as shown by 202 and/or 204 of FIG. 2, while operating in the second mode.

While operating in the third mode, the circuit outputs the first sub-transform and first upper and lower output sub-transforms from the data storage unit 640 to the butterfly circuit 620 to sequentially perform the second butterfly stage 242 and third butterfly stage 244 operations indicated in the second radix stage 262 of FIG. 2. To perform the operations of the second butterfly stage, the first sub-transform and the first upper output sub-transform are input from the data storage unit 640 to the butterfly circuit 620 via multiplexers 652 and 654. In some implementations, the first sub-transform produced while operating in the second mode is output from complex multiplication block 670 to butterfly circuit 620 via signal line 680 and multiplexer 652. Butterfly circuit 620 outputs a second upper output transform, corresponding to the first sub-transform, and a second lower output transform, corresponding to the second sub-transform. The second upper and lower output transforms are stored in data storage unit 640.

To perform the third butterfly stage operations indicated in 244 of FIG. 2, the second lower output sub-transform and the rotated first lower output sub-transform are input from the data storage unit 640 to the butterfly circuit 620 via multiplexers 652 and 654. The resulting third upper and lower output sub-transforms are output to data storage unit 640.

The second upper, third upper, and third lower output transforms are output from data storage unit 640 and the circuit via multiplexer 650. The output sub-transforms of the circuit may be output by multiplexer 650 in natural or digit-reversed order, as required, or may be reused to form a cyclic prefix preceding the output data frame.

FIG. 6-2 is a block diagram of the circuit shown in FIG. 6-1 with example implementations of data storage unit 640, complex multiplication block 670, twiddle factor generator block 630, and butterfly circuit 620 in accordance with one embodiment of the invention.

In this example, butterfly circuit 620 is implemented with a radix-2 circuit. The radix-2 circuit includes complex addition/subtraction blocks 622 and 624. While performing operations of the second butterfly stage, the butterfly circuit is configured to right-shift the input to addition/subtraction block 624 with shift block 626. The shift may be performed with a logical shift operation or with selectable inputs to block 624 from input lines from multiplexer 654.

Data storage unit 640 is implemented with three RAM registers 642, 644, and 646. Each register 642, 644, and 646 is coupled to respective multiplexers 656, 658, 660 to select the input to each register during various modes of operation.

Complex multiplication block 670 is implemented with a complex multiplier 674 and multiplexers 672 and 676. Multiplexer 672 selects the input to complex multiplier 674 during various stages of operation. Multiplexer 672 is configured to select the output 684 from butterfly circuit 620 during the second mode of operation to rotate the first lower output. In this implementation, multiplexer 670 is included to by-pass complex multiplier 674. Multiplexer 670 is configured to by-pass the complex multiplier 674 when complex multiplication circuit 670 receives the first sub-transform because no rotation is necessary. In some embodiments, the first sub-transform can be rotated by a constant twiddle factor equal to one. In such embodiments, by-pass multiplexer 676 is omitted.

Twiddle factors are received from twiddle factor circuit 630. In this example implementation, twiddle factor circuit includes three registers 634, 636, and 638 for storing applicable twiddle factors used to rotate the sub-transforms. Multiplexer 632 is configured to select and output applicable twiddle factors used for rotation during various stages of operation.

In the various embodiments of the present invention, the N/3 FFT processor may be implemented with a number of different FFT processors. In the majority of use cases, the sub-transform may be performed using an FFT processor which accepts a data frame as a burst transfer, takes a number of cycles to transform the data, and then outputs the data frame in a burst transfer. This is known as a "Burst I/O FFT". The total time taken to perform the load/process/unload operation is known as the transform time. The N/3 processor 504 may be a fixed size or may selectably perform FFT operations of several data point sizes. For example, the FFT processor may have a maximum block size of 2048 data points and can operate as an N/4 block to perform N/3 for data frames having 1536 samples.

Figures 1, 7:
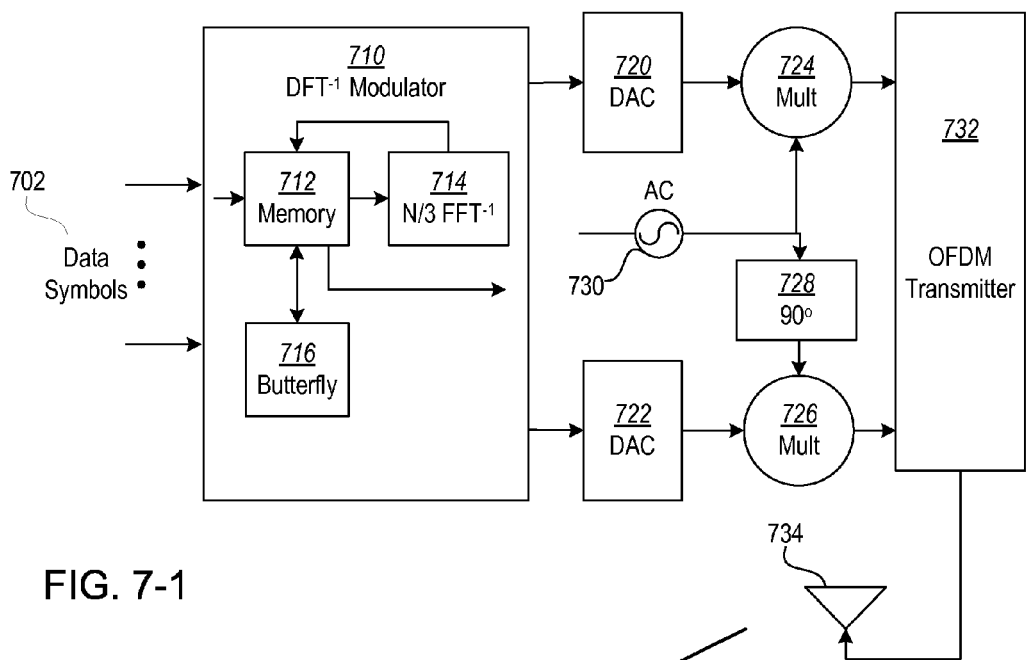
Figures 2, 7:
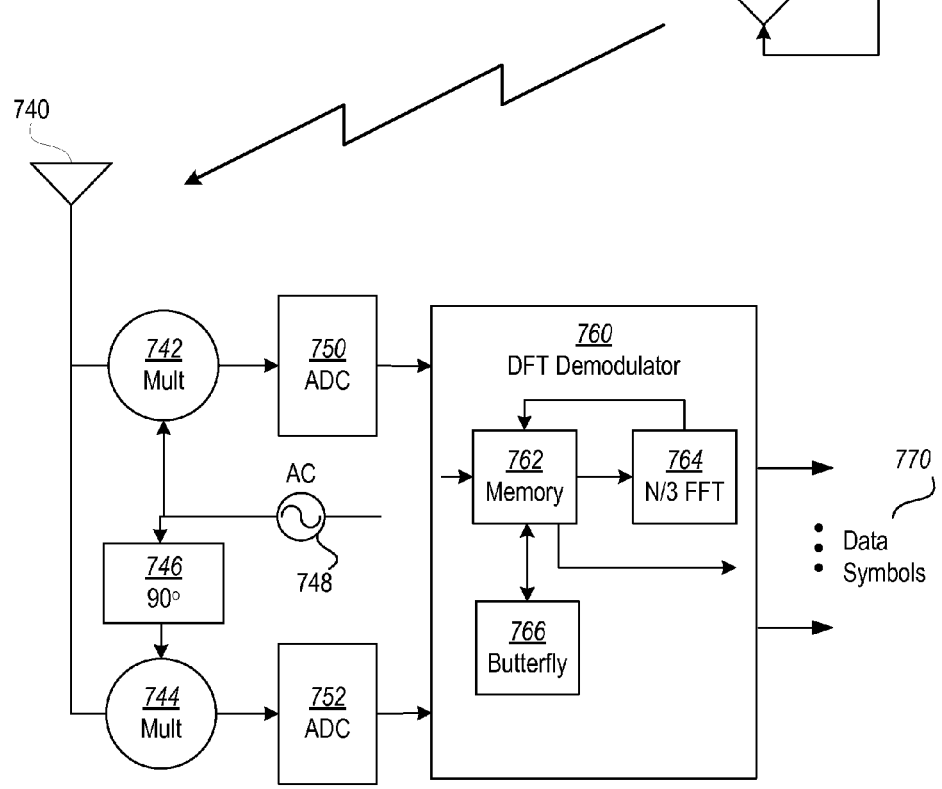

FIGS. 7-1 and 7-2 illustrate a block diagram of an orthogonal frequency-division multiplexing (OFDM) based wireless communication system with radix-3 modulation and demodulation in accordance with various embodiments of the present invention.

FIG. 7-1 shows a block diagram of a transmitter of the OFDM based wireless system. The transmitter includes a DFT modulator circuit 710 for transforming data symbols 702 from the frequency domain into the time domain. The DFT modulator circuit includes a memory circuit 712, an inverse N/3 FFT processor 714, and a butterfly circuit 716 for performing DFTs as described in the various embodiments and examples above. The transformed time-domain samples are converted from digital to analog with digital to analog converters 720 and 722. The converted signals are modulated onto a sine and a cosine wave output from signal generator 730 and phase inverter 728. The sine and cosine waves are modulated with complex multiplication circuits 724 and 726 and are summed and transmitted by OFDM transmitter 732 and antenna 734.

FIG. 7-2 shows a block diagram of a receiver of the OFDM based wireless system. Transmitted signals are received by antenna 740. Base band signals are separated from sine and cosine carrier signals with multipliers 740 and 742. The separated base band signals are converted to digital signals with analog to digital converters 750 and 752. The digitized base band signals are converted from the time domain back to the frequency domain by DFT demodulator 760. The DFT demodulator circuit 760 includes a memory circuit 712, an inverse N/3 FFT processor 714, and a butterfly circuit 716 for performing discrete Fourier transforms as described in the various embodiments and examples above. Demodulated signals 770 are output by DFT circuit 760.

Figure 8:
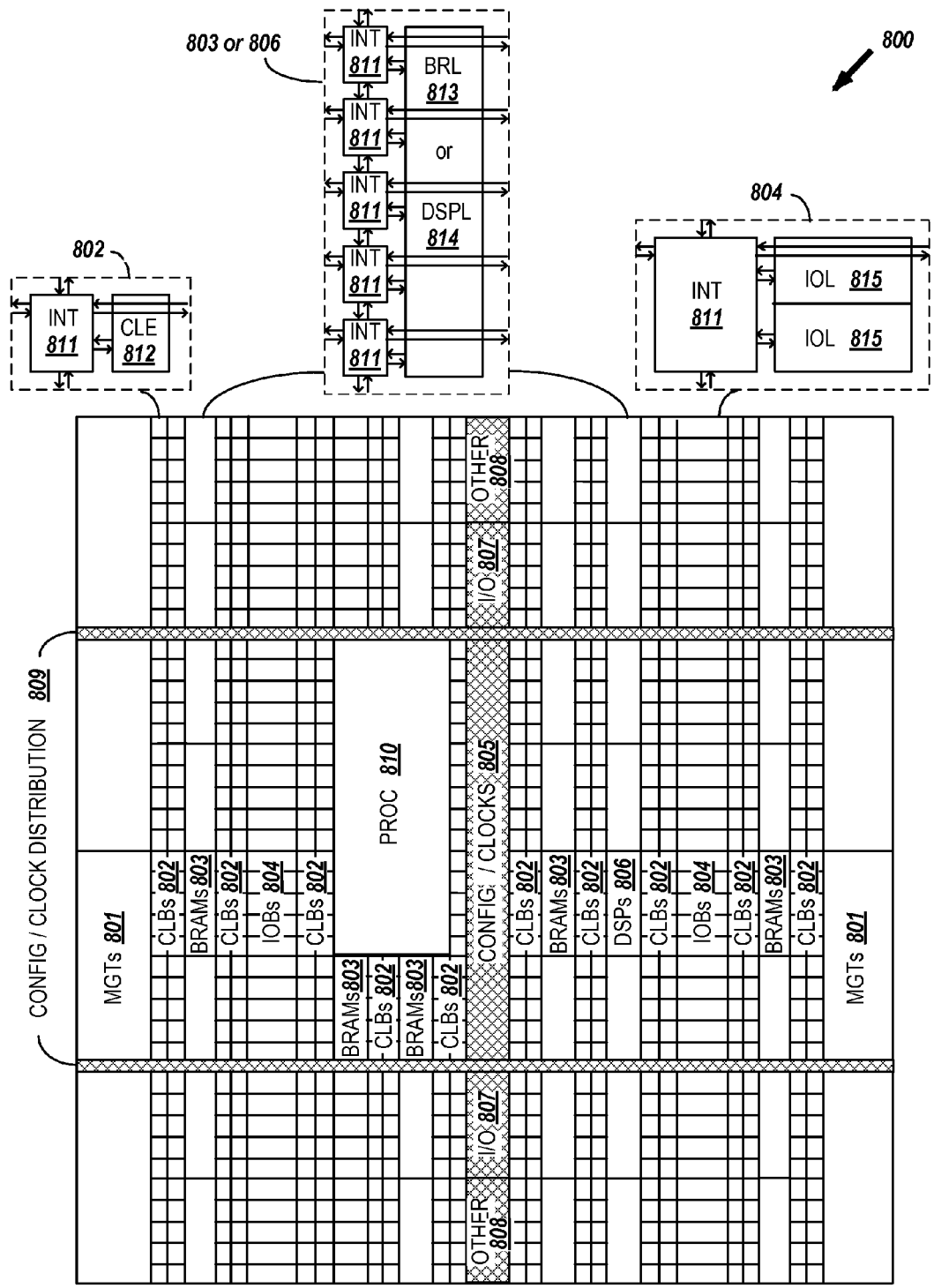
FIG. 8 is a block diagram of an example field programmable gate array (FPGA) that may be configured to implementing DFTs, in accordance with various embodiments of the invention.

FIG. 8 is a block diagram of an example field programmable gate array (FPGA) that may be configured to implement DFTs in accordance with various embodiments of the invention. FPGAs can include several different types of programmable logic blocks in the array. For example, FIG. 8 illustrates an FPGA architecture (800) that includes a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807), for example, e.g., clock ports, and other programmable logic 808 such as digital clock managers, analog-to-digital converters, system monitoring logic, and so forth. Some FPGAs also include dedicated processor blocks (PROC 810).

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic plus a single programmable interconnect element NT 811. A BRAM 803 can include a BRAM logic element (BRL 813) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 806 can include a DSP logic element (DSPL 814) in addition to an appropriate number of programmable interconnect elements. An IOB 804 can include, for example, two instances of an input/output logic element (IOL 815) in addition to one instance of the programmable interconnect element INT 811. As will be clear to those of skill in the art, the actual I/O pads connected, for example, to the I/O logic element 815 are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic.

The present invention is thought to be applicable to a variety of systems that utilize DFT or inverse DFT processing. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for performing mixed-radix discrete Fourier transform on a frame of size N, comprising:
   a fast Fourier transform processor block;
   a memory block having an input coupled to an output of the fast Fourier transform processor block by means of a first circuit path, and an output coupled to an input of the fast Fourier transform processor block; and
   a radix-2 butterfly circuit having first and second inputs coupled to the memory block by means of respective second and third circuit paths, and first and second outputs coupled to the memory block;
   wherein the memory block and fast Fourier transform processor block are configured to
      subdivide the frame into first, second, and third sub-frames of size N/3, and
      perform fast Fourier transform on each of the sub-frames to produce a sub-transform; and
   wherein the radix-2 butterfly circuit is configured to perform radix-2 summation of two of the sub-transforms concurrently with fast Fourier transform of one of the sub-frames.

2. The circuit of claim 1, wherein the first circuit path includes a complex multiplication block, the complex multiplication block having an input coupled to the output of the fast Fourier transform processor block and an output coupled to the input of the memory block.

3. The circuit of claim 2, wherein the circuit is configured to operate in first, second, and third modes; and
   while operating in the first mode:
      the memory block inputs the second sub-frame and a third sub-frame to the fast Fourier transform processor block to produce respective second and third sub-transforms;
      the fast Fourier transform processor block inputs the second and third sub-transforms to the complex multiplication block to apply respective first and second twiddle factors to produce rotated second and third sub-transforms; and
      the memory block receives and stores the rotated second and third sub-transforms output from the complex multiplication block;
   while operating in the second mode:
      the memory block inputs the first sub-frame to the fast Fourier transform processor block to produce a first sub-transform;
      the fast Fourier transform processor block inputs the rotated second and third sub-transforms to the radix-2 butterfly circuit to produce a first upper output and a first lower output; and
      the complex multiplication block multiplies the first lower output by third twiddle factor to produce a rotated first lower output; and
      the memory block receives and stores the first upper output and the rotated first lower output; and
   while operating in the third mode:
      the memory block inputs the first sub-transform and the rotated first upper output to the radix-2 butterfly circuit to produce a second upper output and a second lower output;
      the memory block receives and stores the second upper output;
      the memory block inputs the second lower output and rotated first lower output to the radix-2 butterfly circuit to produce a third upper output and a third lower output; and
      the circuit outputs the second upper output, the third upper output, and the third lower output.

4. The circuit of claim 3, wherein:
   in response to the rotated second and third sub-transforms, the radix-2 butterfly circuit is configured to:
      output a sum of the rotated second and third sub-transforms on the first output, and
      output a difference between the rotated second and third sub-transforms on the second output;
   in response to the second lower output and the rotated first lower output, the radix-2 butterfly circuit is configured to:
      output a sum of the second lower output and the rotated first lower output on the first output; and
      output a difference between the rotated second and third sub-transforms on the second output; and
   in response to the first upper output and the first sub-transform, the radix-2 butterfly circuit is configured to:
      output a sum of the first upper output and the first sub-transform on the first output, and
      output on the second output, a difference between the first sub-transform and the first upper output divided by two.

5. The circuit of claim 3, wherein while operating in the second mode, the circuit concurrently inputs the first sub-frame to the fast Fourier transform processor block to produce the first sub-transform and inputs the rotated second and third sub-transforms to the radix-2 butterfly circuit to produce a first upper output and a first lower output.

6. The circuit of claim 3, wherein:
   the second output of the radix-2 butterfly circuit is coupled to a second input of the complex multiplication block; and
   the complex multiplication block multiplies the first lower output by a twiddle factor to produce the rotated first lower output.

7. The circuit of claim 2, wherein:
the circuit is configured to operate in first, second, and third modes; and
while operating in the first mode:
the memory block inputs the second sub-frame and a third sub-frame to the fast Fourier transform processor block to produce respective second and third sub-transforms;
the fast Fourier transform processor block inputs the second sub-transform to the complex multiplication block to apply a first twiddle factor to produce a rotated second sub-transform; and
the memory block receives and stores the rotated second sub-transform output from the complex multiplication block;
while operating in the second mode:
the memory block inputs the first sub-frame to the fast Fourier transform processor block to produce a first sub-transform;
the memory block inputs the third sub-transform to the complex multiplication block to apply a second twiddle factor to produce a rotated third sub-transform; and
the memory block receives and stores the rotated first sub-transform output from the complex multiplication block;
the memory block inputs the rotated second and third sub-transforms to the radix-2 butterfly circuit to produce a first upper output and a first lower output; and
the complex multiplication block multiplies the first lower output by a third twiddle factor to produce a rotated first lower output;
the memory block receives and stores the first upper output and the rotated first lower output in the memory block; and
while operating in the third mode:
the memory block inputs the first sub-transform and the rotated first upper output to the radix-2 butterfly circuit to produce a second upper output and a second lower output;
the memory block receives and stores the second upper output;
the memory block inputs the second lower output and rotated first lower output to the radix-2 butterfly circuit to produce a third upper output and a third lower output; and
the circuit outputs the second upper output, the third upper output, and the third lower output.

8. The circuit of claim 1, further comprising a complex multiplication block, the complex multiplication block having an input and an output coupled to the memory block.

9. The circuit of claim 1, where N/3 is a power of two.

10. A method for performing discrete Fourier transforms, the method comprising
receiving a data frame of size N;
subdividing the data frame into three sub-frames of size N/3, including a first sub-frame, a second sub-frame, and a third sub-frame beginning at respective indexes 0, 1 and 2 of the data frame;
inputting the second sub-frame to a fast Fourier transform block to produce a second sub-transform;
applying a first twiddle factor to the second sub-transform to produce a rotated second sub-transform;
inputting the third sub- frame to the fast Fourier transform block to produce a third sub-transform;
applying a second twiddle factor to the third sub-transform to produce a rotated third sub-transform;
inputting the rotated second sub-transform and the rotated third sub-transform to a butterfly block to produce a first upper output and a first lower output;
multiplying the first lower output by a third twiddle factor to produce a rotated first lower output;
inputting the first sub-frame to the fast Fourier transform block to produce a first sub-transform;
inputting the first upper output and first sub-transform to the butterfly block to produce a second upper output and a second lower output;
inputting the second lower output and the rotated first lower output to the butterfly block to produce a third upper output and a third lower output; and
storing the second upper output, the third upper output, and the third lower output in a computer readable storage medium.

11. The method of claim 10, wherein the butterfly block is configured to:
add the rotated second sub-transform and the rotated third sub-transform to produce the first upper output; and
subtract the rotated first sub-transform from the rotated second sub-transform to produce the first lower output.

12. The method of claim 10, wherein the butterfly block is configured to:
add the first upper output and the first sub-transform to produce the second upper output;
perform a right shift operation on the first upper output; and
subtract the right shifted first upper output from the first sub-transform to produce the second lower output.

13. The method of claim 10, wherein the butterfly block comprises a radix-2 butterfly circuit.

14. The method of claim 10, wherein the butterfly block comprises a radix-4 butterfly circuit.

15. An Orthogonal Frequency Division Multiplex (OFDM) communication device, comprising:
an input block;
a fast Fourier transform block coupled to the input block;
a complex multiplication block coupled to an output of the fast Fourier transform block, the complex multiplication block being configured to apply twiddle factors to the output of the fast Fourier transform block;
a storage unit having inputs coupled to the input section and to an output of the complex multiplication block;
a radix-2 butterfly block having a first input and second input coupled to the storage unit;
an output block that is coupled to the fast Fourier transform block; and
wherein:
the fast Fourier transform block performs transformations on sub-frames of size N/3 of a data frame of size N; and
the radix-2 butterfly block is configured to perform radix-3 summations in three iterative stages of radix-2 summations.

16. The OFDM communication device of claim 15, wherein the communication device is an OFDM receiver, and the OFDM communication device further includes a receive antenna coupled to an input of the input block.

17. The OFDM communication device of claim 15, wherein the input block includes:
a quadrature demultiplexer coupled to an input of the input block; and
one or more analog to digital converters coupled to an output of the quadrature demultiplexer and an output of the input block.

18. The OFDM communication device of claim 15, wherein:
   the communication device comprises an OFDM transmitter;
   the fast Fourier transform block is configured to perform inverse Fourier transforms; and
   the OFDM communication device further includes an antenna coupled to an output of the output block.

19. The OFDM communication device of claim 18, wherein the output block includes:
   a quadrature demultiplexer coupled to an input of the output block;
   one or more digital to analog converters coupled to one or more inputs of the quadrature demultiplexer; and
   an output amplifier coupled to one or more outputs of the digital to analog converters and an output coupled to an output of the output block.

20. The OFDM communication device of claim 15, wherein at least one of the three iterative stages of radix-2 summations is performed concurrently with the transformation of at least one of the sub-frames of size N/3.

* * * * *